United States Patent
Makki et al.

(10) Patent No.: US 11,853,261 B2
(45) Date of Patent: Dec. 26, 2023

(54) CODED-CACHING IN A WIRELESS COMMUNICATION NETWORK

(71) Applicant: Telefonaktiebolaget LM Ericsson (publ), Stockholm (SE)

(72) Inventors: Behrooz Makki, Pixbo (SE); Mikael Coldrey, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/009,219

(22) PCT Filed: Jun. 10, 2020

(86) PCT No.: PCT/EP2020/066045
§ 371 (c)(1),
(2) Date: Dec. 8, 2022

(87) PCT Pub. No.: WO2021/249631
PCT Pub. Date: Dec. 16, 2021

(65) Prior Publication Data
US 2023/0216919 A1    Jul. 6, 2023

(51) Int. Cl.
*G06F 16/14* (2019.01)
*H04L 67/568* (2022.01)
(Continued)

(52) U.S. Cl.
CPC .......... *G06F 16/152* (2019.01); *G06F 11/073* (2013.01); *G06F 12/121* (2013.01);
(Continued)

(58) Field of Classification Search
CPC ............... G06F 3/04842; G06F 16/152; G06F 16/9574; G06F 16/166; G06F 11/073;
(Continued)

(56) References Cited

U.S. PATENT DOCUMENTS 9,389,965 B1 * 7/2016 Douglis ................ G06F 12/121
9,620,169 B1 * 4/2017 Nolan .................. G11B 27/038
(Continued)

OTHER PUBLICATIONS

International Search Report and Written Opinion issued in International Application No. PCT/EP2020/066045 dated Nov. 11, 2020 (14 pages).
(Continued)

*Primary Examiner* — Kyung H Shin
(74) *Attorney, Agent, or Firm* — Rothwell, Figg, Ernst & Manbeck, P.C.

(57) ABSTRACT

The present disclosure relates to a serving wireless communication node adapted to predict data files (A, B, C) to be requested by at least two served user terminals (2, 3) and to form predicted sub-data files ($A_1$, $A_2$; $B_1$, $B_2$; $C_1$, $C_2$). In a placement phase, the serving node is adapted to transmit predicted sub-data files ($A_1$, $B_1$; $A_2$, $B_2$) to cache nodes ($AP_{C1}$, $AP_{C2}$), each cache node ($AP_{C1}$, $AP_{C2}$) having a unique set of predicted different sub-data files of different predicted data files, and to receive requests (RA, RB) for data files from the served user terminals (2, 3). In a delivery phase, the serving node is adapted to transmit an initial complementary predicted sub-data file (Formula I) to the cache nodes ($AP_{C1}$, $AP_{C2}$), comprising a reversible combination of the remaining predicted sub-data files ($A_2$, $B_1$) for the files requested. If a cache node ($AP_{C1}$, $AP_{C2}$) requests re-transmission ($RA_2$; $RB_1$) of a predicted sub-data file ($A_2$, $B_1$), the serving node (AP) is adapted to transmit a further complementary predicted sub-datafile (Formula II) to the cache nodes ($AP_{C1}$, $AP_{C2}$), the file comprising a reversible combination of at least one re-transmitted predicted sub-data file ($A_2$, $B_1$) and at least one new predicted sub-data file ($C_1$).

16 Claims, 14 Drawing Sheets

(51) Int. Cl.
*H04L 67/1097* (2022.01)
*G06F 12/127* (2016.01)
*G06F 12/121* (2016.01)
*G06F 11/07* (2006.01)
*G11B 27/038* (2006.01)

(52) U.S. Cl.
CPC .......... *G06F 12/127* (2013.01); *G11B 27/038* (2013.01); *H04L 67/1097* (2013.01); *H04L 67/568* (2022.05)

(58) Field of Classification Search
CPC ............. G06F 11/0793; G06F 12/0891; G06F 12/121; G06F 12/123; G06F 3/0641; G06F 12/0269; G06F 12/0276; G06F 11/1453; G06F 12/127; G06F 12/0811; G06F 12/0895; G06F 12/0893; G06F 12/128; G06F 12/0868; H04L 67/04; H04L 67/06; H04L 67/289; G06N 5/04; G11B 27/038; G11B 27/10; G11B 27/031; H04N 5/265
See application file for complete search history.

(56) References Cited

U.S. PATENT DOCUMENTS

| | | | |
|---|---|---|---|
| 2014/0156943 A1* | 6/2014 | Sato | G06F 11/073 |
| | | | 711/135 |
| 2017/0339242 A1 | 11/2017 | Westphal et al. | |
| 2018/0329712 A1* | 11/2018 | Palani | G06F 12/127 |
| 2019/0045333 A1 | 2/2019 | Serbetci et al. | |
| 2020/0159391 A1* | 5/2020 | Kleinpeter | G06F 3/04842 |

OTHER PUBLICATIONS

Maddah-Ali, M. et al., "Coding for Caching: Fundamental Limits and Practical Challenges", IEEE Communications Magazine, vol. 54, No. 8, Aug. 2016 (7 pages).

Maddah-Ali, M., "Fundamental Limits of Caching", IEEE Transactions on Information Theory, vol. 60, No. 5, May 2014 (12 pages).

Clark, D. et al., "Measurement and Analysis of Internet Interconnection and Congestion", 2014 TRPC Conference Paper, Sep. 9, 2014 (16 pages).

McDonald, A., "Cisco: 79% of world's mobile traffic to be video by 2022", Digital TV Europe, Feb. 20, 2019 (2 pages).

* cited by examiner

CODED-CACHING IN A WIRELESS COMMUNICATION NETWORK

CROSS REFERENCE TO RELATED APPLICATIONS

This application is a 35 U.S.C. § 371 National Stage of International Patent Application No. PCT/EP2020/066045, filed 2020 Jun. 10.

TECHNICAL FIELD

The present disclosure relates to improved coded-caching at a serving node and a cache node in a wireless communication network.

BACKGROUND

Today, a large part of world's mobile traffic comprises video communication that normally is pre-recorded, and typically is a long signal. This means that, as opposed to the cases with interactive applications such as gaming and voice calls, it is possible to predict and plan for video communication, as well as for other types of predictable data transfer such as photos and trending news. In other words, soon most of the data traffic will be cacheable, i.e., the signals which are of interest in near future can be stored at intermediate nodes to reduce the backhauling load and transmission delay. A method called coded-caching has been introduced which, using the principals of network coding, improves the performance of cache networks significantly.

While coded-caching reduces the peak backhaul traffic during high-traffic periods, it increases the data traffic in the low-traffic periods significantly. This leads to an inefficient data transmission for a large portion of time slots, additional energy consumption as well as interference to neighbor nodes. Importantly, in coded-caching, the buffers of the cache nodes are filled in with no or outdated knowledge of the UEs requests which reduces the probability of hit-rate, i.e., the probability that the caches are correctly filled in the files that the UEs will request in the future.

It is therefore desired to provide improved coded-caching means and methods in a wireless communication network.

SUMMARY

It is an object of the present disclosure to provide improved coded-caching means and methods in a wireless communication network.

This object is obtained by means of a serving wireless communication node in a wireless communication system. The serving node is adapted to predict data files to be requested at a later time by at least two served user terminals, and to divide the predicted data files such that predicted sub-data files are formed. In a placement phase, the serving node is adapted to transmit a number of predicted sub-data files to corresponding cache nodes such that each cache node has a unique set of predicted different sub-data files of different predicted data files, and to receive requests for data files from the served user terminals. In a delivery phase, the serving node is adapted to transmit an initial complementary predicted sub-data file to the cache nodes. The initial complementary predicted sub-data file comprises a reversible combination of the remaining predicted sub-data files for the files requested, enabling each cache node to re-create the data file requested by the corresponding served user terminal. In case at least one cache node is unable to decode a predicted sub-data file and requests re-transmission, the serving node is adapted to receive the request for re-transmission and to transmit a further complementary predicted sub-data file to the cache nodes. The further complementary predicted sub-data file comprises a reversible combination of at least one re-transmitted predicted sub-data file and at least one new predicted sub-data file.

In this way, the backhaul load during the placement phase is reduced, because part of the placement is performed during the high-traffic delivery phases, without affecting the system performance during the delivery phase. Moreover, because the placement according to the present disclosure is performed during the delivery phase, it enables running efficient prediction algorithms to use the recent requests of the user terminals and predict the files of interest in the following slots. This will increase the hit-rate significantly, as opposed to previous coded-caching schemes where there is a gap between the placement and delivery phases.

The cost of caching during the placement phase is thus reduced without affecting system performance during the delivery phase. Furthermore, energy efficiency and end-to-end throughput are improved and interference to neighbor nodes is reduced. As a result, there will be a better balance between the placement and delivery phases of caching networks. The data placement in the cache nodes does not need to be limited to low-traffic time slots which provides a possibility to increase the hit-rate, i.e., the probability of correctly filling the caches with the files requested in the future.

According to some aspects, the reversible combination is an Xor, exclusive or, combination. This is only an example of a useful reversible combination that is easily calculated.

According to some aspects, the further complementary predicted sub-data file comprises a reversible combination of all predicted sub-data files for which the cache nodes have requested re-transmission following an initiated delivery phase, and at least one new predicted sub-data file.

This means that the further complementary predicted sub-data file can handle several predicted sub-data files for which the cache nodes have requested re-transmission.

This object is also obtained by means of a cache node in a wireless communication system. The cache node is adapted for communication with at least one served user terminal and a serving wireless communication node. The cache node is further adapted to, in a placement phase, receive, from the serving node, and store, predicted sub-data files which comprise different parts of different data files, and to receive a request for a data file from a served user terminal. The cache node is further adapted to, in a delivery phase, receive, from the serving node, an initial complementary predicted sub-data file comprising a reversible combination of the remaining predicted sub-data file for the file requested and another stored predicted sub-data file, enabling the cache node to re-create the data file requested by the corresponding served user terminal. In case the cache node is unable to decode a predicted sub-data file, the cache node is adapted to request re-transmission, and to receive, from the serving node, a further complementary predicted sub-data file comprising a reversible combination of the re-transmitted predicted sub-data file and at least one new predicted sub-data file.

In this way, the backhaul load during the placement phase is reduced, because part of the placement is performed during the high-traffic delivery phases, without affecting the system performance during the delivery phase. Moreover, because the placement according to the present disclosure is performed during the delivery phase, it enables running efficient prediction algorithms to use the recent requests of the user terminals and predict the files of interest in the following slots. This will increase the hit-rate significantly, as opposed to previous coded-caching schemes where there is a gap between the placement and delivery phases.

The cost of caching during the placement phase is thus reduced without affecting system performance during the delivery phase. Furthermore, energy efficiency and end-to-end throughput are improved and interference to neighbor nodes is reduced. As a result, there will be a better balance between the placement and delivery phases of caching networks. The data placement in the cache nodes does not need to be limited to low-traffic time slots which provides a possibility to increase the hit-rate, i.e., the probability of correctly filling the caches with the files requested in the future.

According to some aspects, the reversible combination is an Xor, exclusive or, combination. This is only an example of a useful reversible combination that is easily calculated.

According to some aspects, the cache node is adapted to derive two accumulated copies of the signals associated with the undecoded predicted sub-data file by means of the received further complementary predicted sub-data file, and to decode the undecoded predicted sub-data file by means of said copies. The cache node is further adapted to combine the predicted sub-data files such that a requested data file is formed, and to forward the requested data file to the user terminal. The user terminal then acquires the requested data file at a relatively low system cost.

This object is also obtained by means of cache nodes, methods and a communication system that are associated with the above advantages.

BRIEF DESCRIPTION OF THE DRAWINGS

The present disclosure will now be described more in detail with reference to the appended drawings, where.

DETAILED DESCRIPTION

Figure 1:
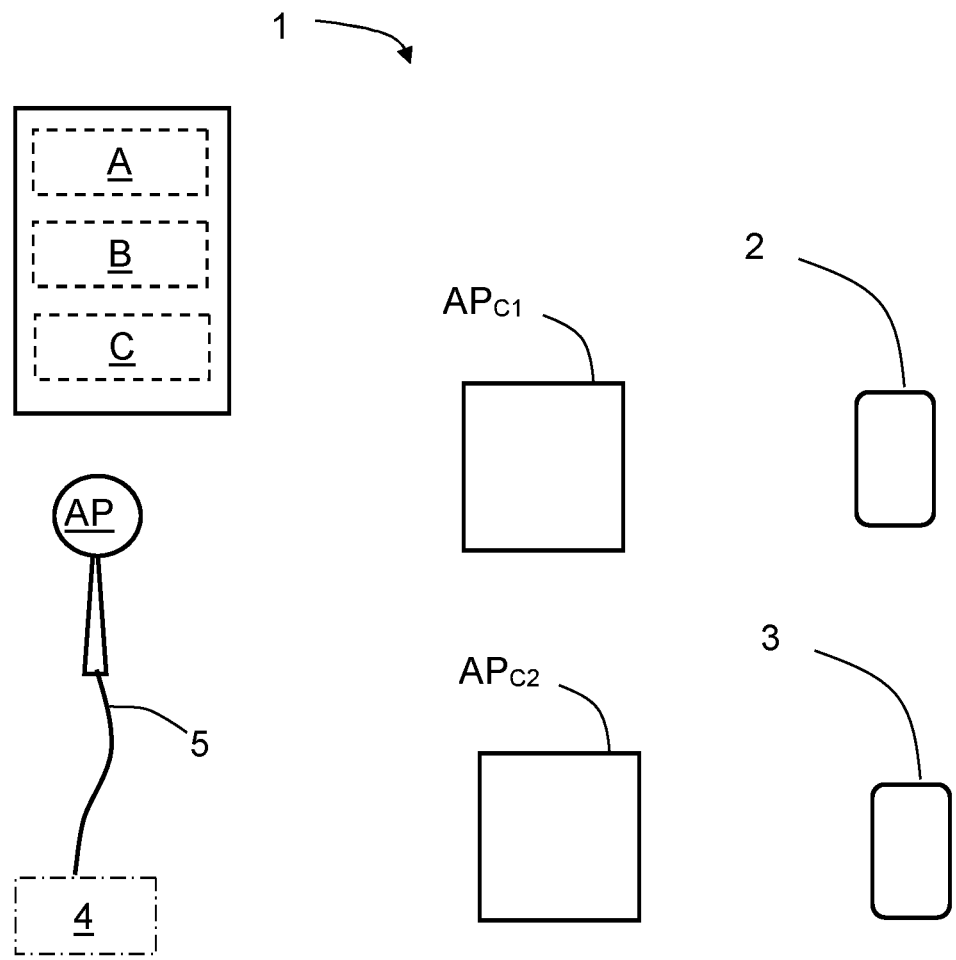
FIG. 1 schematically shows a view of a wireless communication system according to a first example at a first set of actions.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

As shown in FIG. 1 that illustrates a first example, there is a serving node wireless communication node AP in a wireless communication system 1, where the serving node AP is adapted to predict a number of data files A, B, C to be requested at a later time by at least two served user terminals 2, 3. For example, for video communication that normally is pre-recorded and typically is a relatively long signal, as well as for other types of predictable data transfer such as photos and trending news, it is possible to predict and plan for the associated communications.

There are also two cache nodes $AP_{C1}$, $AP_{C2}$ which are adapted to buffer data, sent from the serving node AP, for possible transmission to the served user terminals 2, 3 in case the served user terminals 2, 3 request any of the buffered data. A first cache node $AP_{C1}$ is adapted to buffer data for possible transmission to a first served user terminal 2, and a second cache node $AP_{C2}$ is adapted to buffer data for possible transmission to a second served user terminal 3. In this case, the cache nodes $AP_{C1}$, $AP_{C2}$ are adapted to serve the served user terminals 2, 3 with low end-to-end latency.

With caching, the data is transmitted in two phases, first a placement phase where, during a low-traffic period, the serving node AP fills in the cache nodes $AP_{C1}$, $AP_{C2}$ with predicted data. At a following delivery phase, during a high-traffic period, the serving node AP updates the cache nodes $AP_{C1}$, $AP_{C2}$ and provides each cache nodes $AP_{C1}$, $AP_{C2}$ with data for its associated served user terminals 2, 3 based on their respective requests.

Here, the objective is to minimize the worst-case backhaul traffic, i.e., the load of data transmission from the serving node AP to the cache nodes $AP_{C1}$, $AP_{C2}$ during the high-traffic periods. This will reduce the end-to-end latency and allow the served user terminals 2, 3 to access their signals of interest fast when they ask for them. In order to minimize the amount of data to be sent during the high-traffic periods, so-called coded-caching can be used, and will be described in the following. It is to be noted that the following examples are relatively uncomplicated in order to facilitate comprehension, in reality there are probably more components in the wireless communication system, in particular more cache nodes and several served user terminals for every cache node.

Figure 2:
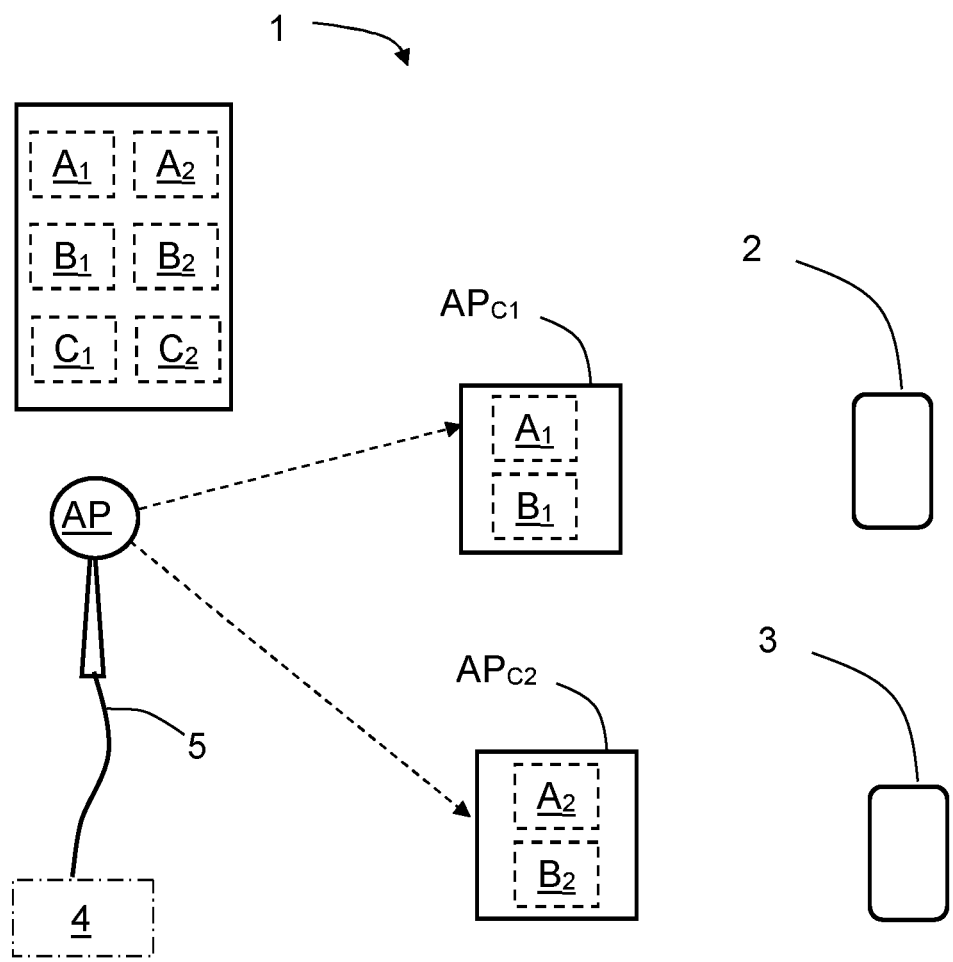
FIG. 2 schematically shows a view of the wireless communication system according to the first example at a second set of actions.

In the illustrated first example, as shown in FIG. 1 that shows a first set of actions, the serving node AP has predicted three data files A, B, C; a first predicted data file A, a second predicted data file B and a third predicted data file C. As shown in FIG. 2, showing a second set of actions, the serving node AP is adapted to divide each file into two or more sub-files, e.g., two predicted sub-data files $A_1$, $A_2$; $B_1$, $B_2$; $C_1$, $C_2$ for each predicted data file A, B, C. The serving node AP is thus adapted to divide the predicted data files A, B, C, for example by the number of user terminals, such that predicted sub-data files $A_1$, $A_2$; $B_1$, $B_2$; $C_1$, $C_2$ are formed. In this example, each predicted data file A, B, C are divided into two predicted sub-data files $A_1$, $A_2$; $B_1$, $B_2$; $C_1$, $C_2$, should there be three user terminals, each predicted data file A, B, C would be divided into three predicted sub-data files and so on. The predicted data files A, B, C need not be divided by the number of user terminals, but can be divided in any suitable manner.

During the placement phase, the serving node AP is adapted to transmit a number of predicted sub-data files $A_1$, $B_1$; $A_2$, $B_2$ to corresponding cache nodes $AP_{C1}$, $AP_{C2}$ such that each cache node $AP_{C1}$, $AP_{C2}$ has a unique set of predicted different sub-data files of different predicted data files. The serving node AP uses sending and buffers different predicted sub-data files $A_1$, $B_1$; $A_2$, $B_2$ in the cache nodes $AP_{C1}$, $AP_{C2}$ by means of separate spectral resources. In this example, a first predicted sub-data file $A_1$ of the first predicted data file A and a first predicted sub-data file $B_1$ of the second predicted data file B are stored in the first cache node $AP_{C1}$, and a second predicted sub-data file $A_2$ of the first predicted data file A and a second predicted sub-data file $B_2$ of the second predicted data file B are stored in the second cache node $AP_{C2}$. In this way, each cache node $AP_{C1}$, $AP_{C2}$ has a unique set of predicted different sub-data files of different predicted data files A, B, and the backhaul traffic of the serving node AP in low-traffic period is 2 files, more precisely 4 sub-files $A_1$, $B_1$; $A_2$, $B_2$. However, this specific placement method simplifies the data transmission during the delivery phase, which is the phase of interest for load reduction.

Figure 3:
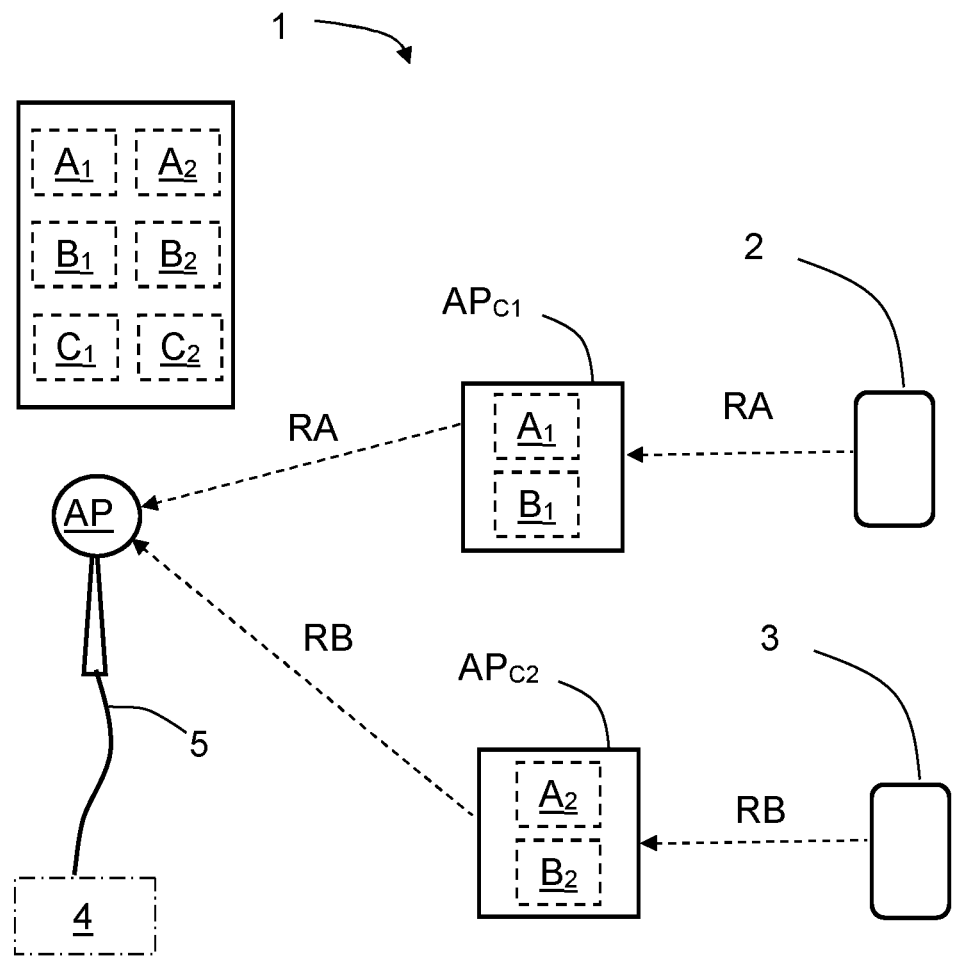
FIG. 3 schematically shows a view of the wireless communication system according to the first example at a third set of actions.

In this example, with reference to FIG. 3 showing a third set of actions, the serving node AP is adapted to receive requests RA, RB for data files from the served user terminals 2, 3. The first served user terminal 2 requests RA the first predicted file A, and the second served user terminal 3 requests RB the second predicted file A. The requests RA, RB can be sent directly to the serving node AP, or to the serving node AP via the corresponding cache nodes $AP_{C1}$, $AP_{C2}$ as illustrated in FIG. 3. In any case, the serving node AP is adapted to receive requests RA, RB for data files from the served user terminals 2, 3, directly or indirectly. Furthermore, both the serving node AP and the cache nodes $AP_{C1}$, $AP_{C2}$ know what the user terminals 2, 3 are requesting, and if some parts of the requested data has been cached already or not.

Figure 4:
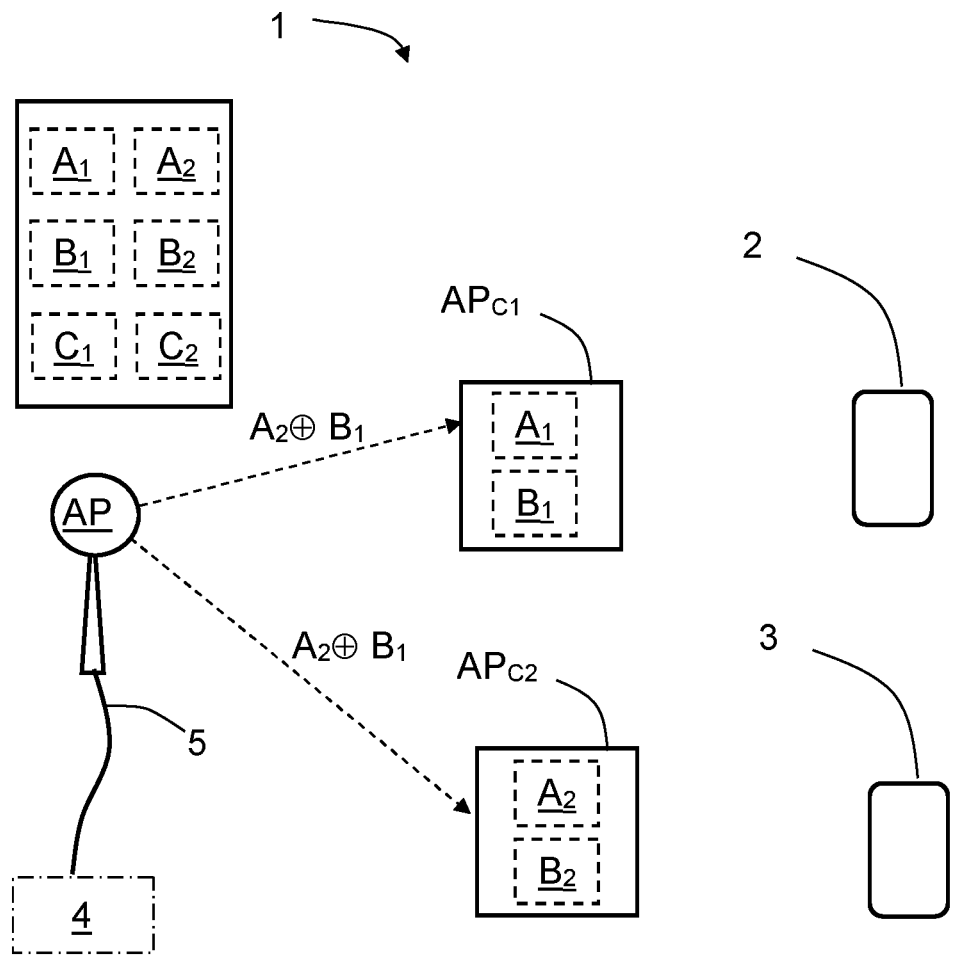
FIG. 4 schematically shows a view of the wireless communication system according to the first example at a fourth set of actions.

With reference now to FIG. 4 showing a fourth set of actions, in the delivery phase, the serving node AP then broadcasts an initial complementary predicted sub-data file in the form of a first combined sub-file $A_2 \oplus B_1$ to the cache nodes $AP_{C1}$, $AP_{C2}$, where $\oplus$ is the Xor, exclusive or, operator used at the second predicted sub-data file $A_2$ of the first predicted data file A and the first predicted sub-data file $B_1$ of the second predicted data file B. As a simple example for explaining the principle, if the second predicted sub-data file $A_2$ of the first predicted data file A is 10011001 and the first predicted sub-data file $B_1$ of the second predicted data file B is 00110111, the combined sub-file is $10011001 \oplus 00110111 = 10101110$. This means that with knowledge of either one of the second predicted sub-data file $A_2$ of the first predicted data file A, or the first predicted sub-data file $B_1$ of the second predicted data file B, any other one of these can be extracted from the first combined sub-file $A_2 \oplus B_1$ that has been broadcast.

Generally, in the delivery phase, the serving node AP is adapted to broadcast a first complementary predicted sub-data file $A_2 \oplus B_1$ to the cache nodes $AP_{C1}$, $AP_{C2}$ in the same spectral resources, the first complementary predicted sub-data file $A_2 \oplus B_1$ comprising an exclusive-or combination of the remaining predicted sub-data files $A_2$, $B_1$ for the files requested, enabling each cache node $AP_{C1}$, $AP_{C2}$ to re-create the data file A, B requested by the corresponding served user terminal 2, 3.

Here, the term broadcasting means that the serving node AP sends a single signal and different nodes, here the cache node $AP_{C1}$, $AP_{C2}$, listen. Broadcasting, using the same spectral resources, is used for the delivery phase, while different spectral resources are used for the placement phase.

Figure 5:
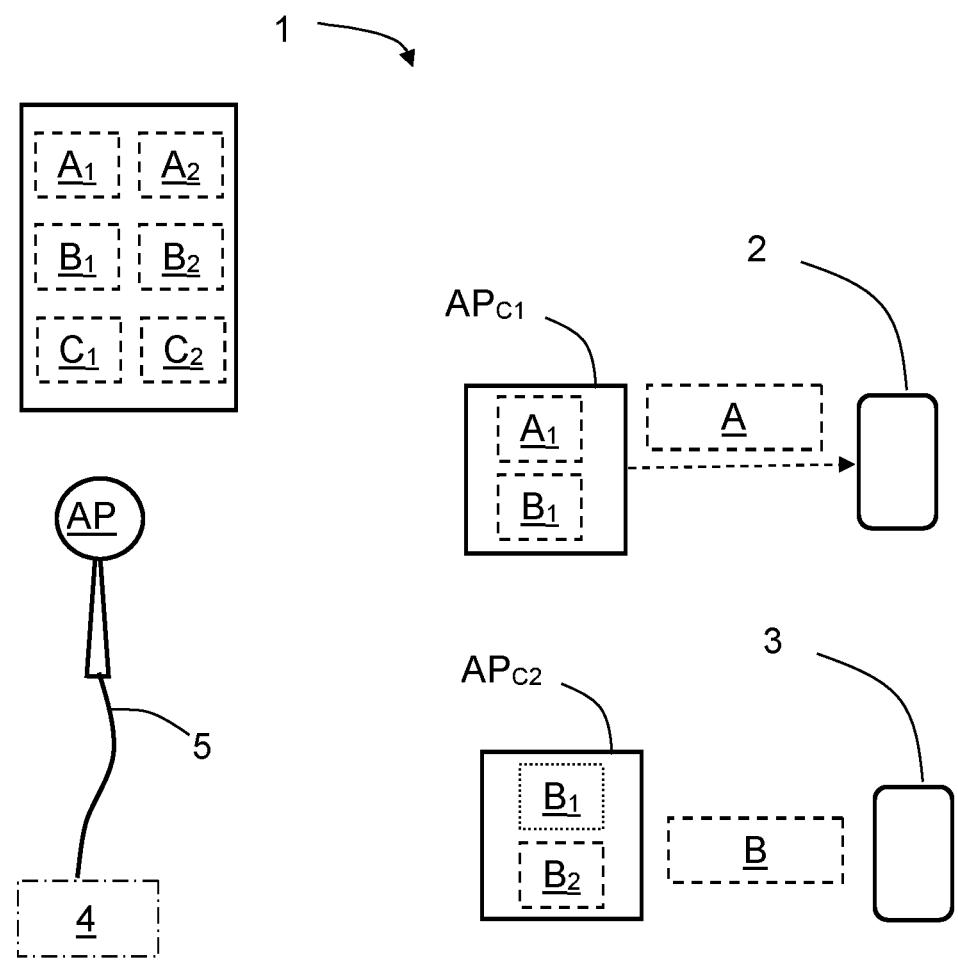
FIG. 5 schematically shows a view of the wireless communication system at a set of actions that correspond to prior art.

With reference to FIG. 5 that shows a set of actions that correspond to prior art, this means that having the first predicted sub-data file $B_1$ of the second predicted data file B, the first cache node $AP_{C1}$ can extract the second predicted sub-data file $A_2$ of the first predicted data file A from the first combined sub-file $A_2 \oplus B_1$, and combine it with the already-buffered first predicted sub-data file $A_1$ of the first predicted data file A to generate the requested first predicted data file A and forward it to the first user terminal 2.

Correspondingly, having the second predicted sub-data file $A_2$ of the first predicted data file A, the second cache node $AP_{C2}$ can extract the first predicted sub-data file $B_1$ of the second predicted data file B from the first combined sub-file $A_2 \oplus B_1$, and combine it with the already-buffered second predicted sub-data file $B_2$ of the second predicted data file B to generate the requested second predicted data file B and forward it to the second user terminal 3.

In this way, in the present example, the coded-caching reduces the backhauling traffic of the high-traffic period from 1 file in a traditional scheme to 0.5 file, yielding 50% gain in backhauling. This is of course the case for the uncomplicated example with two cache nodes and a buffer memory size of two sub-files each. Naturally, the performance gain of coded-caching increases rapidly with the number of cache nodes and their buffer sizes.

It should be noted that the load reduction of coded-caching in high-traffic periods is at the cost of increasing the data traffic in low-traffic periods. Although this point does not affect the scheduling delay, because the serving node AP has free spectrum in low-traffic periods, it increases the energy consumption of the serving node AP and leads to additional interference to neighbor nodes.

With coded-caching, the buffers of the cache nodes are filled in with no or outdated knowledge about user terminal requests. This affects the hit-rate in cache nodes. Also, the serving node AP needs to wait for low-traffic periods to fill in/update the cache nodes which affects the efficiency of the cache nodes.

In view of the above, it is desired to reduce the backhaul load during the placement phase, while not affecting the backhaul traffic of the delivery phase. At the same time, it should be possible to update the cache nodes more regularly and, consequently, increase the hit rate.

Figure 6:
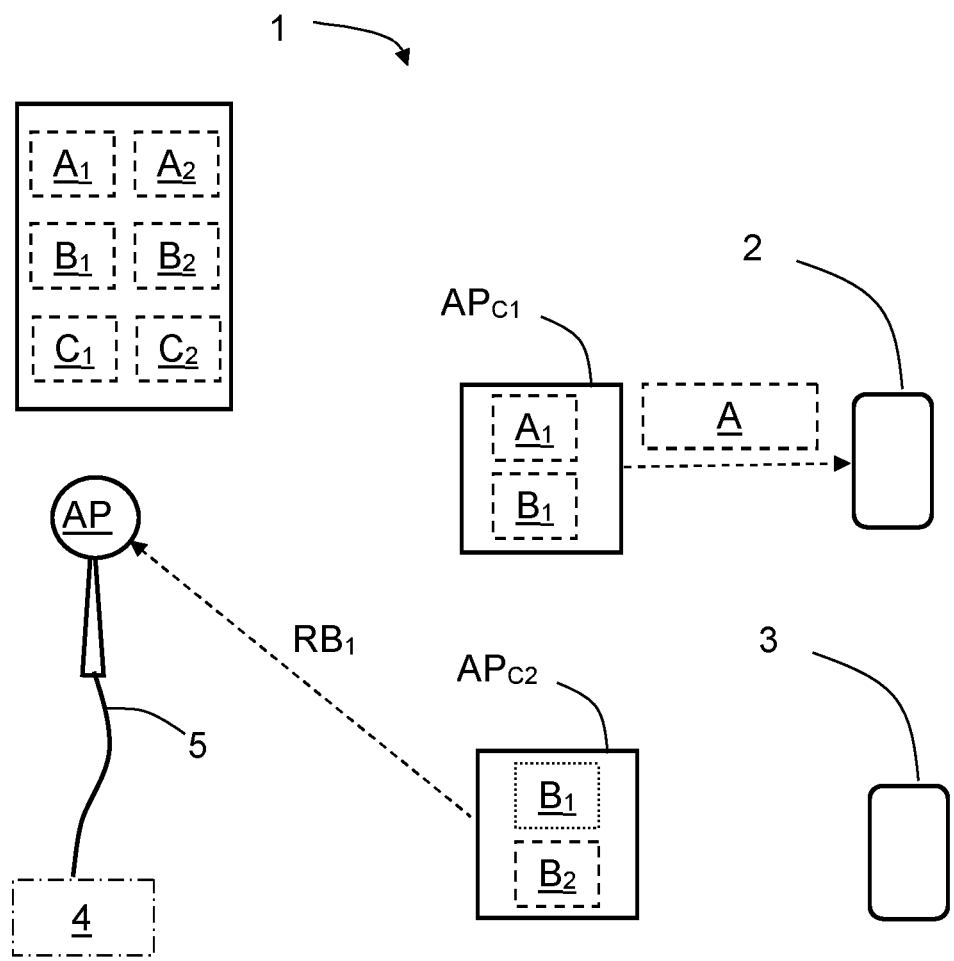
FIG. 6 schematically shows a view of the wireless communication system according to the first example at a fifth set of actions.
Figure 7:
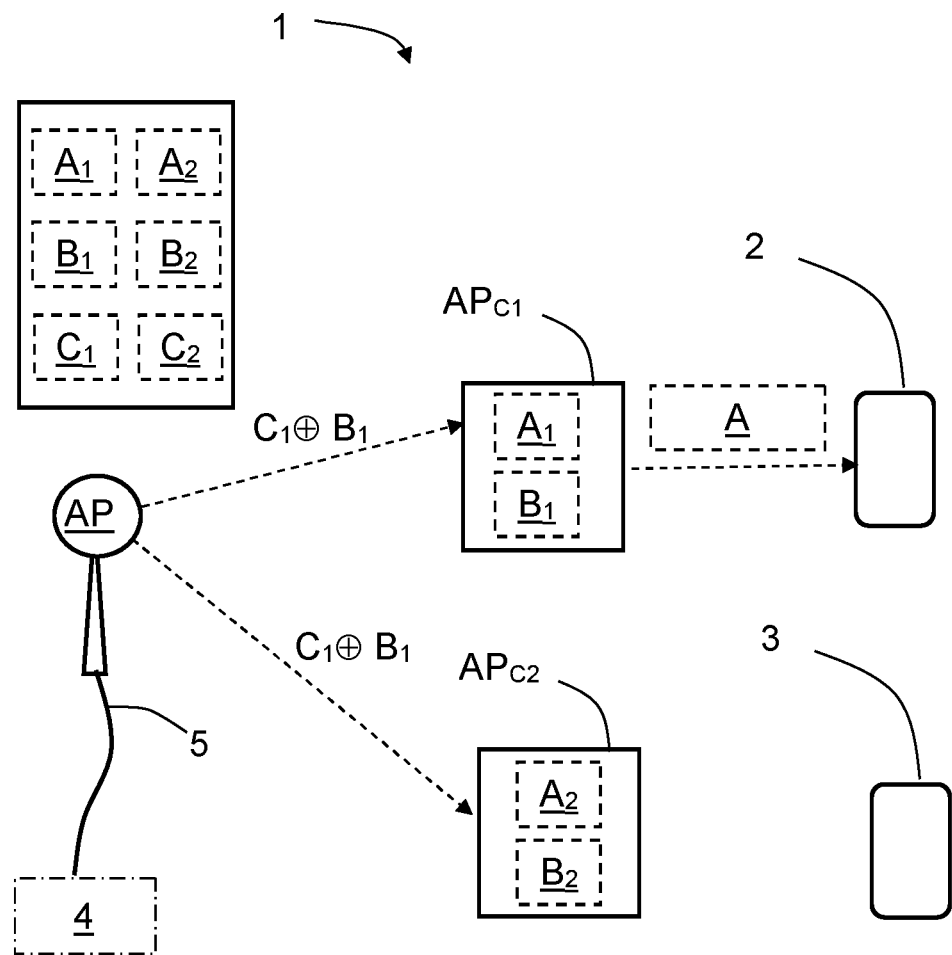
FIG. 7 schematically shows a view of the wireless communication system according to the first example at a sixth set of actions.

According to the present disclosure, as shown in FIG. 6 showing a fifth set of actions, there is a case where at least one cache node $AP_{C1}$, $AP_{C2}$ is unable to decode a predicted sub-data file. Here, the second cache node $AP_{C2}$ is unable to decode the first predicted sub-data file $B_1$ of the second predicted data file B, and the cache node $AP_{C2}$ requests re-transmission $RB_1$. As shown in FIG. 7 showing a sixth set of actions, the serving node AP is then adapted to transmit a further complementary predicted sub-data file in the form of a second combined sub-file $C_1 \oplus B_1$, constituting a second complementary predicted sub-data file $C_1 \oplus B_1$, to the cache nodes $AP_{C1}$, $AP_{C2}$, the second complementary predicted sub-data file $C_1 \oplus B_1$ comprising an exclusive-or combination of the re-transmitted predicted sub-data file $B_1$ and at least one new predicted sub-data file $C_1$.

More in detail, it is assumed that the next file in turn for placement in at least one of the cache nodes $AP_{C1}$, $AP_{C2}$ is the third file C. The first predicted sub-data file $B_1$ of the second predicted data file B is to be re-transmitted to the second cache node $AP_{C2}$, and therefore the second combined sub-file $C_1 \oplus B_1$ is derived and comprises an Xor combination of a first predicted sub-data file $C_1$ of the third predicted data file C and the first predicted sub-data file $B_1$ of the second predicted data file B.

In this manner, the placement and delivery phases are combined. In the first cache node $AP_{C1}$, already having the first predicted sub-data file $B_1$ of the second predicted data file B, it can be subtracted from the second combined sub-file $C_1 \oplus B_1$, and the first predicted sub-data file $C_1$ of the third predicted data file C can be buffered, if required. In the second cache node $AP_{C2}$, on the other hand, the two accumulated copies of the signals associated with the first predicted sub-data file $B_1$ of the second predicted data file B are combined by, e.g., maximum ratio combining, and the first predicted sub-data file $B_1$ of the second predicted data file B can now be correctly decoded.

Figure 8:
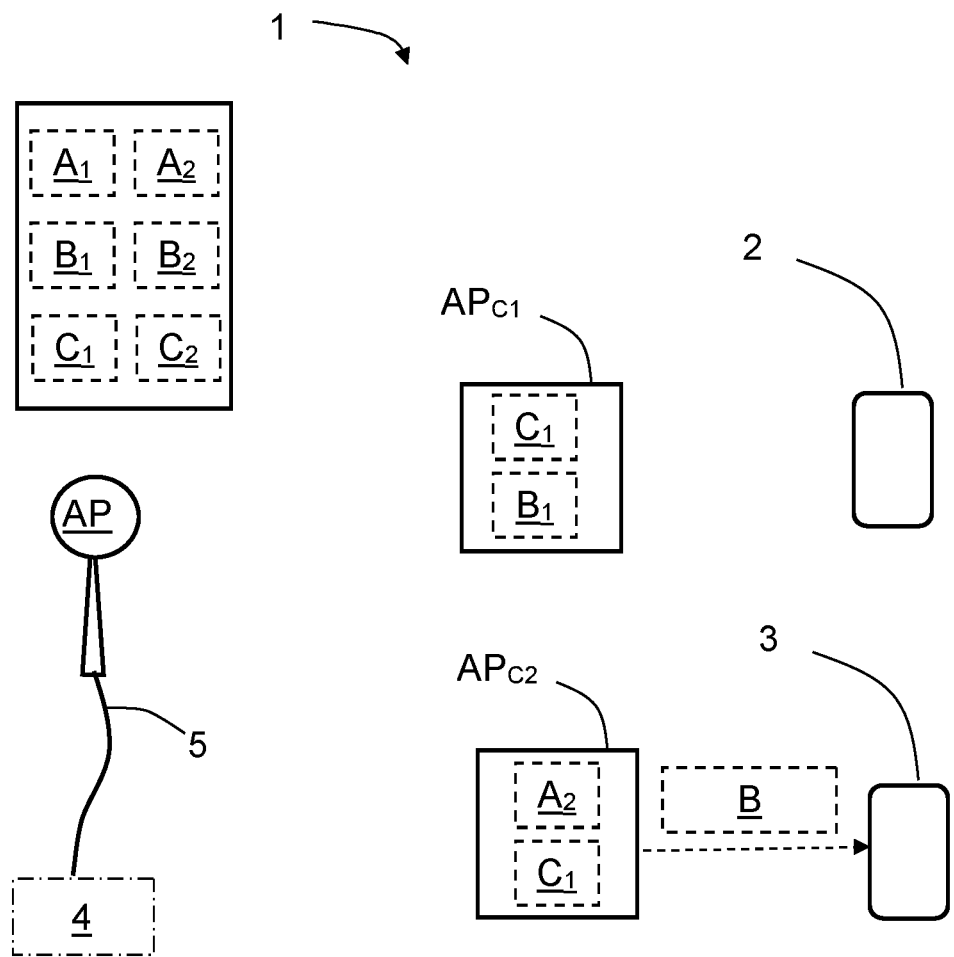
FIG. 8 schematically shows a view of the wireless communication system according to the first example at a seventh set of actions.

Then, as shown in FIG. 8 that shows a seventh set of actions, the first predicted sub-data file $B_1$ and the second predicted sub-data file $B_2$ of the second predicted data file B are combined at the second cache node $AP_{C2}$ to generate the requested second predicted data file B that is forwarded to the second user terminal 3. The first predicted sub-data file $C_1$ of the third predicted data file C is buffered at the first cache node $AP_{C1}$.

In this way, the backhaul load during the placement phase is reduced, because part of the placement is performed during the high-traffic delivery phases, without affecting the system performance during the delivery phase. Moreover, because the placement according to the present disclosure is performed during the delivery phase, it enables running efficient prediction algorithms to use the recent requests of the user terminals 2, 3 and predict the files of interest in the following slots. This will increase the hit-rate significantly, as opposed to previous coded-caching schemes where there is a gap between the placement and delivery phases.

Furthermore, to enable the scheme according to the present disclosure, the serving node AP should be adapted to inform the cache nodes $AP_{C1}$, $AP_{C2}$ about the message decoding status of the other nodes, or about the messages that should be kept in the buffer of one node for possible use in retransmissions to the other node.

Figure 9:
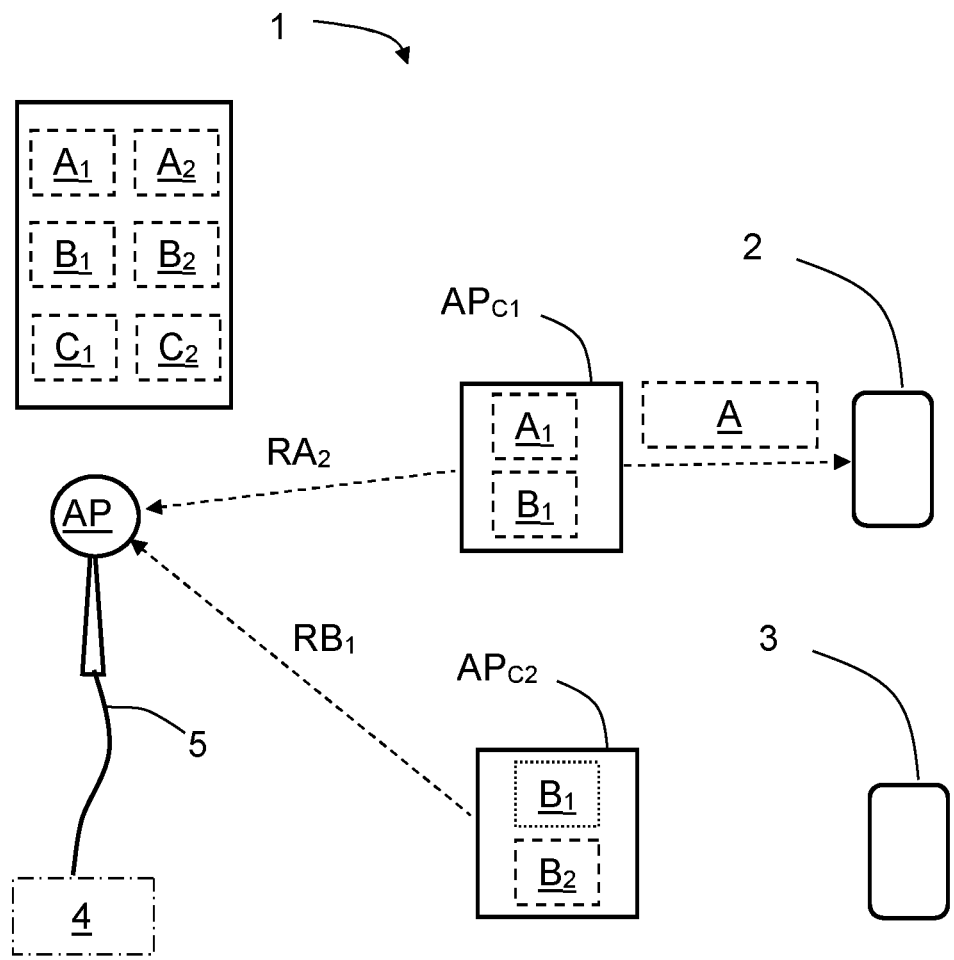
FIG. 9 schematically shows a view of the wireless communication system according to a second example at a first set of actions.

The example discussed has been related to a situation where the first cache node $AP_{C1}$ is successful in removing the first predicted sub-data file $B_1$ of the second predicted data file B and then decoding the second predicted sub-data file $A_2$ of the first predicted data file A. However, the same approach is applicable if both cache nodes should fail to decode their signals of interest during the delivery phase. Particularly, with reference to FIG. 9 that shows a first set of actions for a second example, if both cache nodes $AP_{C1}$, $AP_{C2}$ fail to decode the second predicted sub-data file $A_2$ of the first predicted data file A, and the first predicted sub-data file $B_1$ of the second predicted data file B, from the first combined sub-file $A_2 \oplus B_1$, the first cache nodes $AP_{C1}$ requests $RA_2$ the second predicted sub-data file $A_2$ of the first predicted data file A, and the second cache nodes $AP_{C2}$ requests retransmission $RB_1$ the first predicted sub-data file $B_1$ of the second predicted data file B, as illustrated in FIG. 9.

Figure 10:
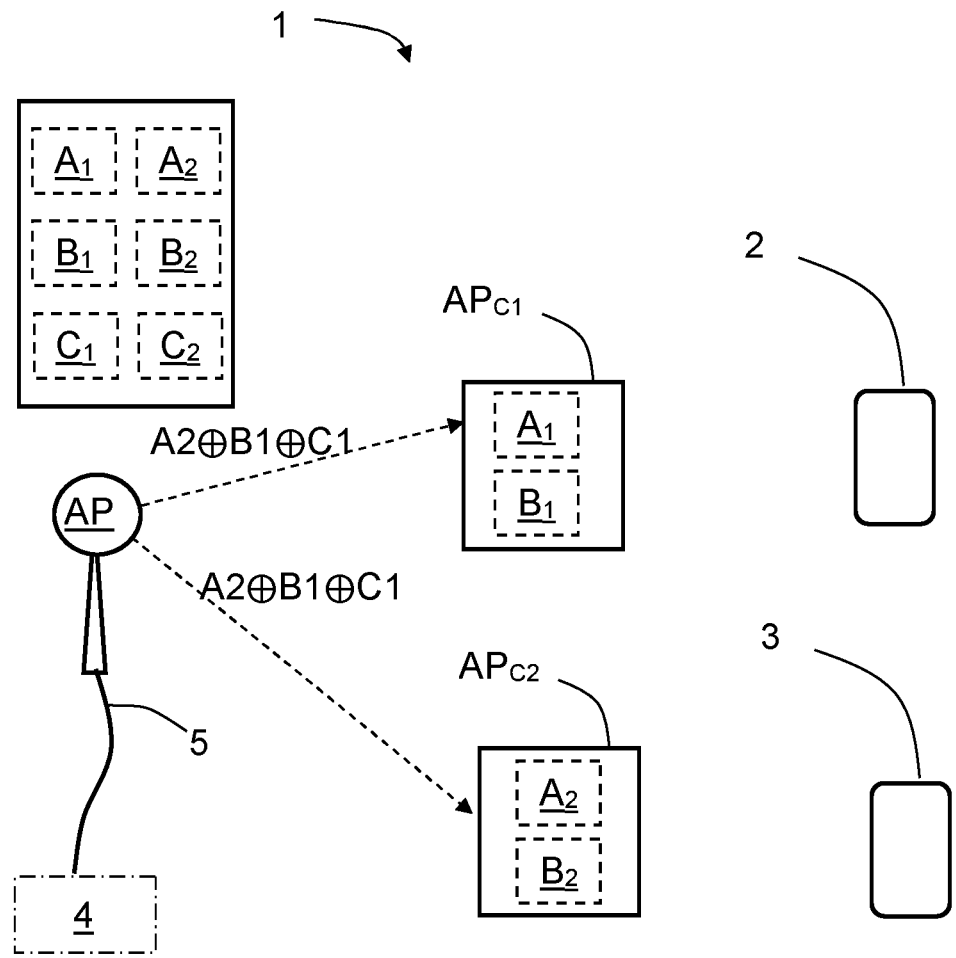
FIG. 10 schematically shows a view of the wireless communication system according to a second example at a second set of actions.

In this alternative example, the re-transmission that is illustrated in FIG. 10, showing a second set of actions for the second example, is now made for an alternative further complementary predicted sub-data file in the form of a third combined sub-file $A_2 \oplus B_1 \oplus C_1$ that comprises an Xor combination of the second predicted sub-data file $A_2$ of the first predicted data file A, the first predicted sub-data file $B_1$ of the second predicted data file B, and the first predicted sub-data file $C_1$ of the third predicted data file C.

Figure 11:
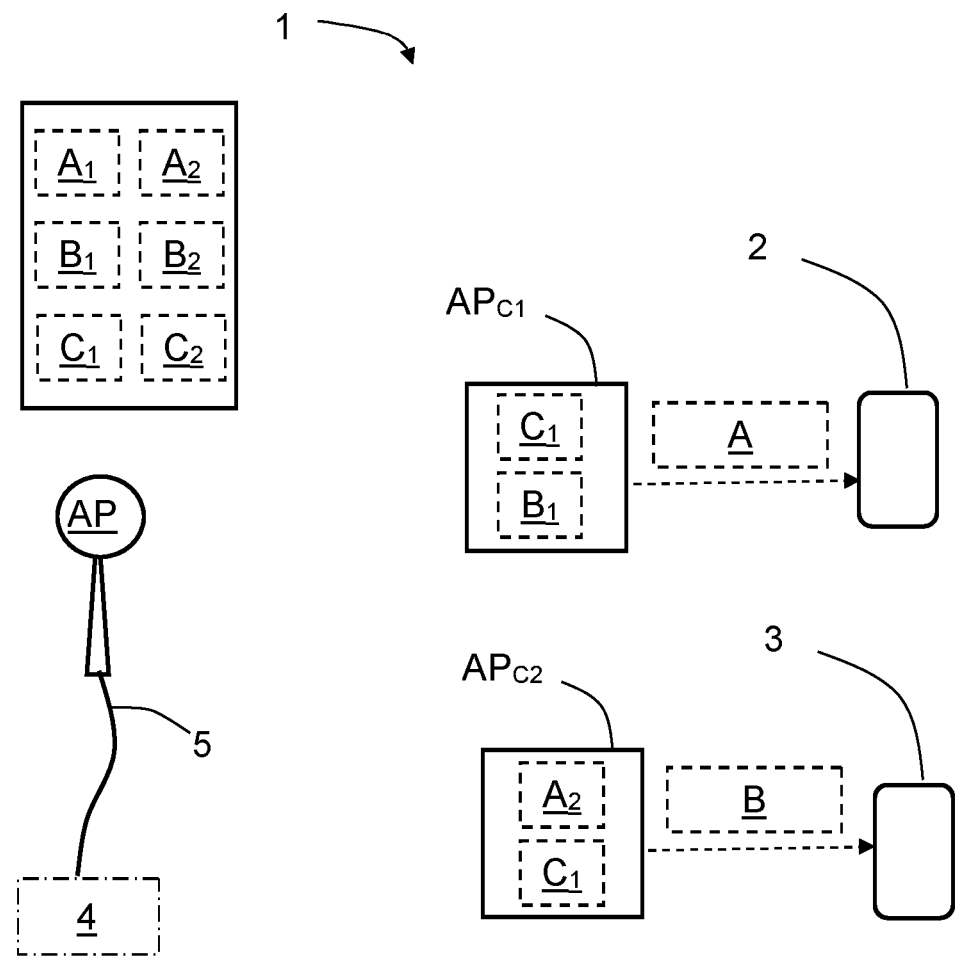
FIG. 11 schematically shows a view of the wireless communication system according to a second example at a third set of actions.

Then, e.g., the first cache node $AP_{C1}$ first uses the already-buffered first predicted sub-data file $B_1$ of the second predicted data file B to generate a fourth combined sub-file $A_2 \oplus C_1$ that comprises an Xor combination of the second predicted sub-data file $A_2$ of the first predicted data file A, and the first predicted sub-data file $C_1$ of the third predicted data file C. The two received copies of the signals associated with the second predicted sub-data file $A_2$ of the first predicted data file A are used to decode the second predicted sub-data file $A_2$ of the first predicted data file A, and the first cache node $AP_{C1}$ can then generate the first predicted data file A, send it to the first user terminal 2, and finally buffer the first predicted sub-data file $C_1$ of the third predicted data file C as illustrated in FIG. 11 showing a third set of actions for the second example. The first predicted sub-data file $C_1$ of the third predicted data file C is only buffered if required, at both cache nodes $AP_{C1}$, $AP_{C2}$, at one of the cache nodes $AP_{C1}$, $AP_{C2}$, or at none of the cache nodes $AP_{C1}$, $AP_{C2}$. This depends on the present situation regarding requests and/or determined probability of requests from the user terminals 2, 3.

In a similar manner, the second cache node $AP_{C2}$ generates the second predicted data file B and sends it to the second user terminal 3.

This is of course applicable for any number of cache nodes failing decode their signals of interest during the delivery phase.

Generally, in case at least one cache node $AP_{C1}$, $AP_{C2}$ is unable to decode a predicted sub-data file $A_2$, $B_1$, said cache node $AP_{C1}$, $AP_{C2}$ requests re-transmission $RA_2$; $RB_1$. The serving node AP is then adapted to receive the request for re-transmission $RA_2$; $RB_1$ and to transmit a further complementary predicted sub-data file $C_1 \oplus B_1$; $A_2 \oplus B_1 \oplus C_1$ to the cache nodes $AP_{C1}$, $AP_{C2}$. The further complementary predicted sub-data file $C_1 \oplus B_1$; $A_2 \oplus B_1 \oplus C_1$ comprises a reversible combination of at least one re-transmitted predicted sub-data file $A_2$, $B_1$ and at least one new predicted sub-data file $C_1$.

The present disclosure is applicable not only for video communications, but for other data types as long as their requests can be predicted in any suitable manner.

Figure 12:
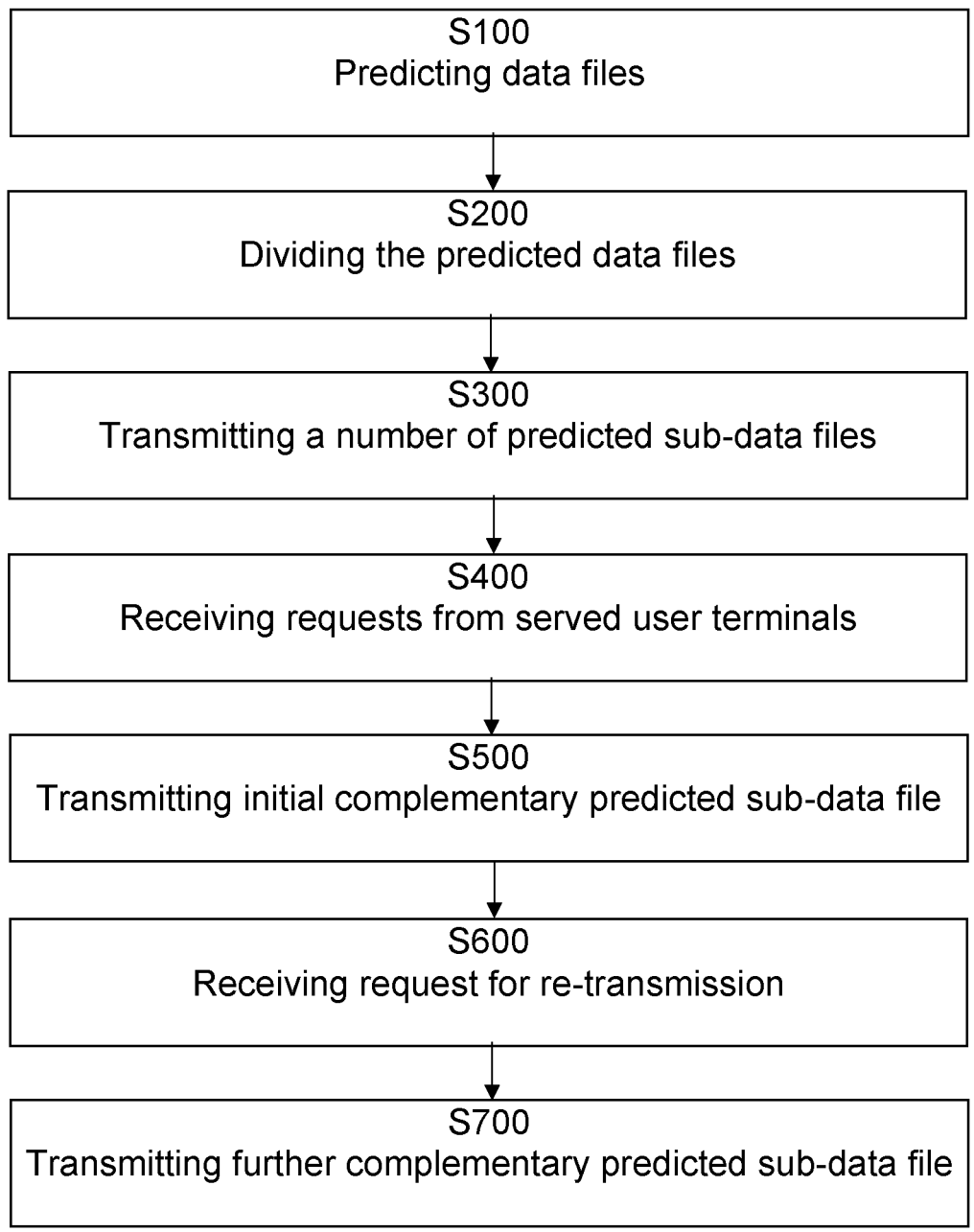
FIG. 12 shows a flowchart of methods according to embodiments.

With reference to FIG. 12, the present disclosure also relates to a method in a serving wireless communication node $AP_1$ in a wireless communication system 1, wherein the method comprises predicting S100 data files A, B, C to be requested at a later time by at least two served user terminals 2, 3, and dividing S200 the predicted data files A, B, C such that predicted sub-data files $A_1$, $A_2$; $B_1$, $B_2$; $C_1$, $C_2$ are formed. In a placement phase, the method comprises transmitting S300 a number of predicted sub-data files $A_1$, $B_1$; $A_2$, $B_2$ to corresponding cache nodes $AP_{C1}$, $AP_{C2}$ such that each cache node $AP_{C1}$, $AP_{C2}$ has a unique set of predicted different sub-data files of different predicted data files, and receiving S400 requests RA, RB for data files from the served user terminals 2, 3. In a delivery phase the method further comprises transmitting S500 an initial complementary predicted sub-data file $A_2 \oplus B_1$ to the cache nodes $AP_{C1}$, $AP_{C2}$, the initial complementary predicted sub-data file $A_2 \oplus B_1$ comprising a reversible combination of the remaining predicted sub-data files $A_2$, $B_1$ for the files requested, enabling each cache node $AP_{C1}$, $AP_{C2}$ to re-create the data file A, B requested by the corresponding served user terminal 2, 3. In case at least one cache node $AP_{C1}$, $AP_{C2}$ is unable to decode a predicted sub-data file $A_2$, $B_1$ and requests re-transmission $RA_2$; $RB_1$, the method comprises receiving S600 the request for re-transmission $RA_2$; $RB_1$, and transmitting S700 a further complementary predicted sub-data file $C_1 \oplus B_1$; $A_2 \oplus B_1 \oplus C_1$ to the cache nodes $AP_{C1}$, $AP_{C2}$. The further complementary predicted sub-data file $C_1 \oplus B_1$; $A_2 \oplus B_1 \oplus C_1$ comprises a reversible combination of at least one re-transmitted predicted sub-data file $A_2$, $B_1$ and at least one new predicted sub-data file $C_1$.

According to some aspects, the reversible combination is an Xor, exclusive or, combination.

According to some aspects, the further complementary predicted sub-data file $C_1 \oplus B_1$; $A_2 \oplus B_1 \oplus C_1$ comprises a reversible combination of all predicted sub-data file $A_2$, $B_1$ for which cache nodes $AP_{C1}$, $AP_{C2}$ have requested re-transmission following an initiated delivery phase, and at least one new predicted sub-data file $C_1$.

Figure 13:
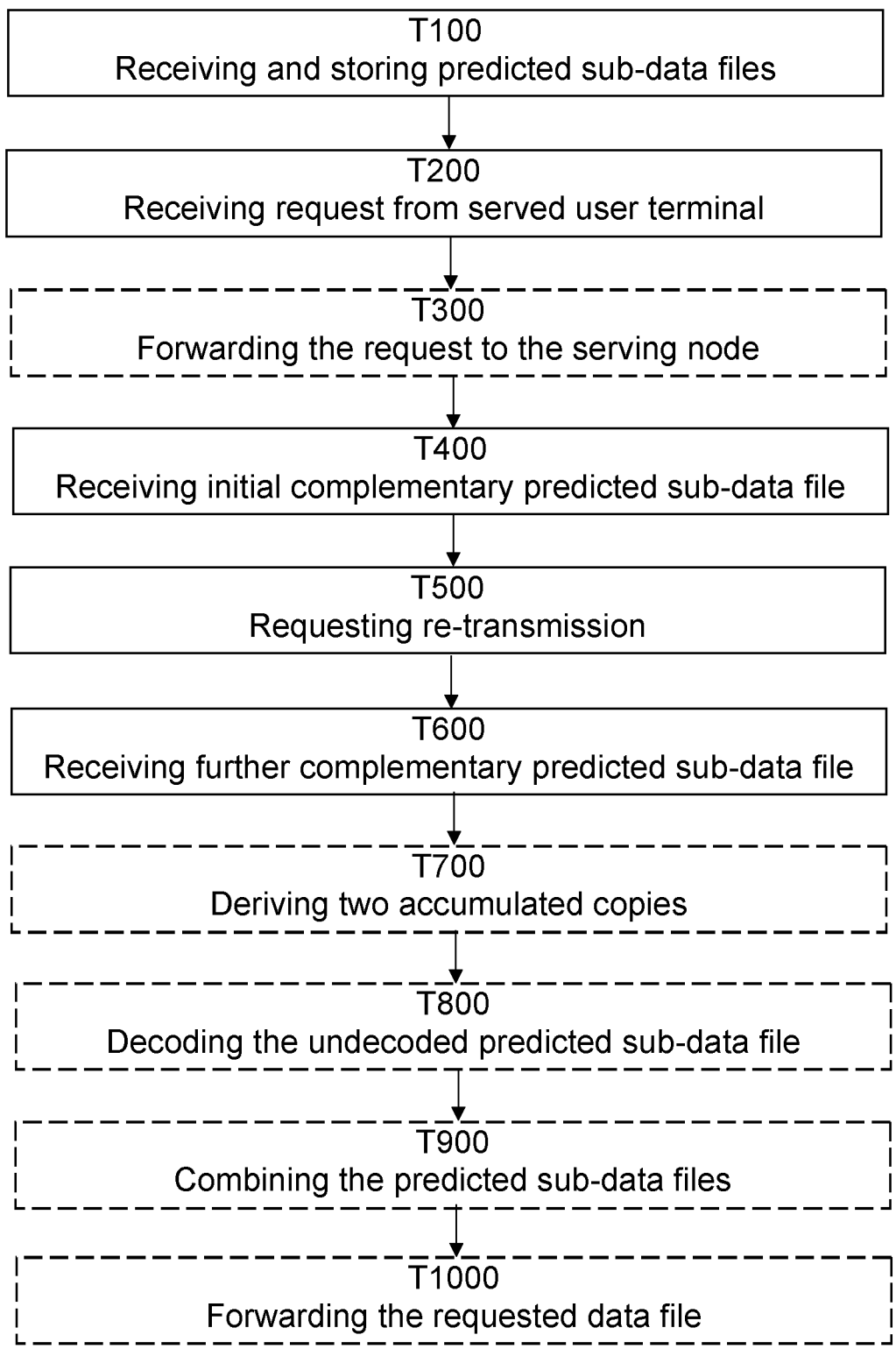
FIG. 13 shows a flowchart of methods according to embodiments.

With reference to FIG. 13, the present disclosure also relates to a method in a cache node $AP_{C1}$, $AP_{C2}$ in a wireless communication system 1, wherein the method comprises, in a placement phase, receiving T100, from a serving node AP, and storing, predicted sub-data files $A_1$, $B_1$; $A_2$, $B_2$ which comprise different parts of different data files A, B, and receiving T200 a request for a data file RA, RB from a served user terminal 2, 3. In a delivery phase, the method comprises receiving T400, from the serving node AP, an initial complementary predicted sub-data file $A_2 \oplus B_1$ comprising a reversible combination of the remaining predicted sub-data file $A_2$; $B_1$ for the file requested and another stored predicted sub-data file $B_1$; $A_2$, enabling the cache node $AP_{C1}$, $AP_{C2}$ to re-create the data file A, B requested by the corresponding served user terminal 2, 3. In case the cache node $AP_{C1}$, $AP_{C2}$ is unable to decode a predicted sub-data file $A_2$; $B_1$, the method comprises requesting T500 re-transmission $RA_2$; $RB_1$, and receiving T600, from the serving node AP, a further complementary predicted sub-data file $C_1 \oplus B_1$; $A_2 \oplus B_1 \oplus C_1$ comprising a reversible combination of the re-transmitted predicted sub-data file $A_2$; $B_1$ and at least one new predicted sub-data file $C_1$.

According to some aspects, the reversible combination is an Xor, exclusive or, combination.

According to some aspects, the method comprises forwarding T300 the request RA, RB for a data file A, B from the served user terminal 2, 3 to the serving node AP.

According to some aspects, the method comprises deriving T700 two accumulated copies of the signals associated with the undecoded predicted sub-data file $A_2$, $B_1$ by using the received further complementary predicted sub-data file $C_1 \oplus B_1$; $A_2 \oplus B_1 \oplus C_1$, decoding T800 the undecoded predicted sub-data file $A_2$, $B_1$ by means of said copies, combining T900 the predicted sub-data files $A_1$, $A_2$; $B_1$, $B_2$ such that a requested data file A, B is formed, and forwarding T1000 the requested data file A, B to the user terminal 2, 3.

Figure 14:
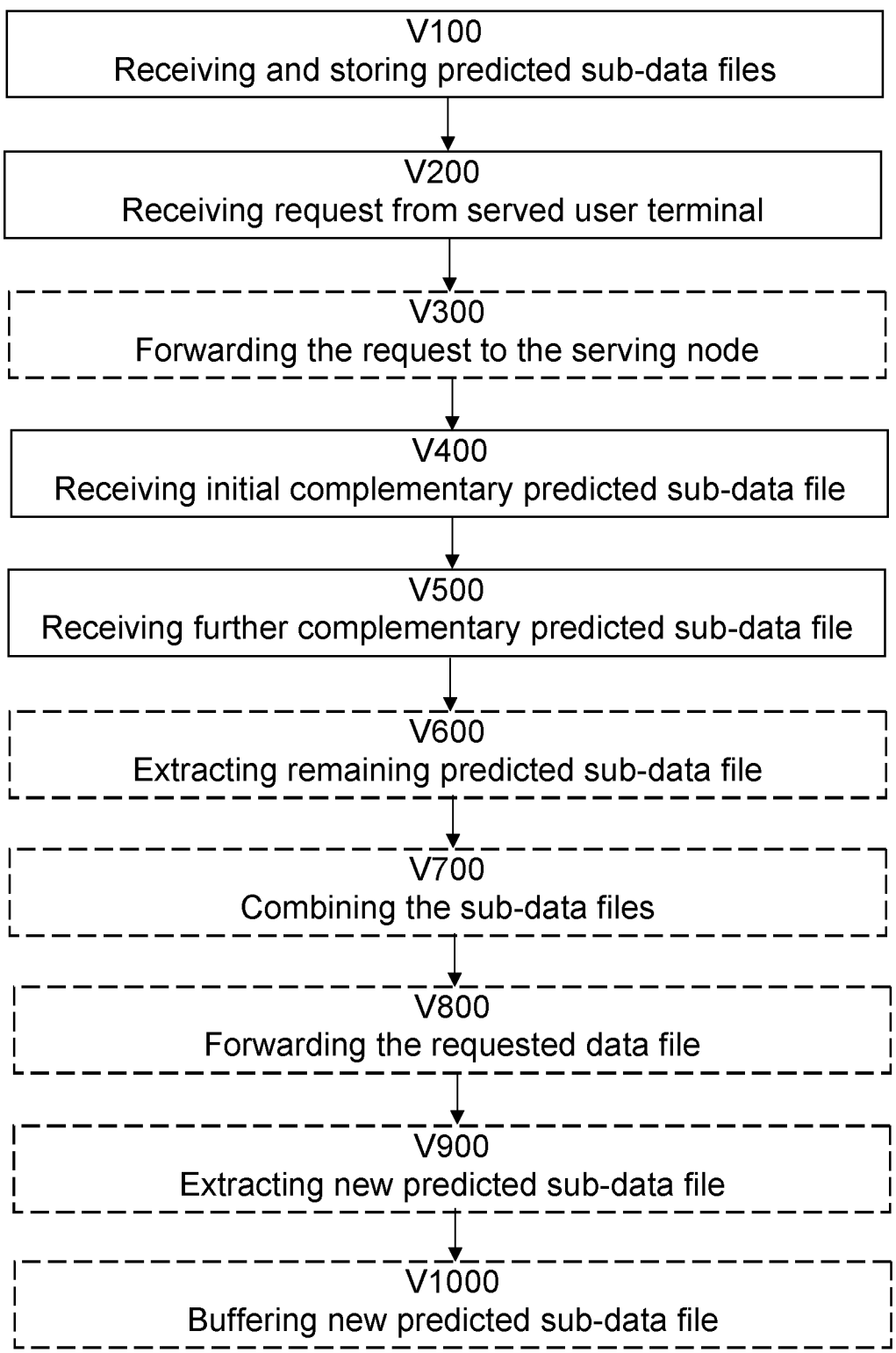
FIG. 14 shows a flowchart of methods according to embodiments.

With reference to FIG. 14, the present disclosure also relates to a method in a cache node $AP_{C1}$ in a wireless communication system 1, wherein the method comprises, in a placement phase, receiving V100, from a serving node AP, and storing, predicted sub-data files $A_1$, $B_1$ which comprise different parts of different data files A, B, and receiving V200 a request for a data file RA from a served user terminal 2. In a delivery phase, the method comprises receiving V400, from the serving node AP, an initial complementary predicted sub-data file $A_2 \oplus B_1$ comprising a reversible combination of the remaining predicted sub-data file $A_2$ for the file requested and another stored predicted sub-data file $B_1$, enabling the cache node to re-create the data file A requested by the corresponding served user terminal 2; and receiving V500, from the serving node AP, a further complementary predicted sub-data file $C_1 \oplus B_1$ comprising a reversible combination of a re-transmitted predicted sub-data file $B_1$ and at least one new predicted sub-data file $C_1$.

According to some aspects, the reversible combination is an Xor, exclusive or, combination.

According to some aspects, the method comprises forwarding V300 the request RA, RB for a data file A, B from the served user terminal 2, 3 to the serving node AP.

According to some aspects, the method comprises extracting V600 the remaining predicted sub-data file $A_2$ from the initial complementary predicted sub-data file $A_2 \oplus B_1$, combining V700 the sub-data files $A_1$, $A_2$ to generate the requested data file A, and forwarding V800 the requested data file A to the served user terminal 2.

According to some aspects, the method comprises extracting V900 the new predicted sub-data file $C_1$ from the further complementary predicted sub-data file $C_1 \oplus B_1$, and buffering V1000 the new predicted sub-data file $C_1$.

Generally, the present disclosure relates to a serving wireless communication node AP in a wireless communication system 1, where the serving node AP is adapted to predict data files A, B, C to be requested at a later time by at least two served user terminals 2, 3 and to divide the predicted data files A, B, C such that predicted sub-data files $A_1$, $A_2$; $B_1$, $B_2$; $C_1$, $C_2$ are formed. In a placement phase, the serving node AP is adapted to transmit a number of predicted sub-data files $A_1$, $B_1$; $A_2$, $B_2$ to corresponding cache nodes $AP_{C1}$, $AP_{C2}$ such that each cache node $AP_{C1}$, $AP_{C2}$ has a unique set of predicted different sub-data files of different predicted data files, and to receive requests RA, RB for data files from the served user terminals 2, 3. In a delivery phase, the serving node AP is adapted to transmit an initial complementary predicted sub-data file $A_2 \oplus B_1$ to the cache nodes $AP_{C1}$, $AP_{C2}$, the initial complementary predicted sub-data file $A_2 \oplus B_1$ comprising a reversible combination of the remaining predicted sub-data files $A_2$, $B_1$ for the files requested. This enables each cache node $AP_{C1}$, $AP_{C2}$ to re-create the data file A, B requested by the corresponding served user terminal 2, 3. In case at least one cache node $AP_{C1}$, $AP_{C2}$ is unable to decode a predicted sub-data file $A_2$, $B_1$ and requests re-transmission $RA_2$; $RB_1$, the serving node AP is adapted to receive the request for re-transmission $RA_2$; $RB_1$ and to transmit a further complementary predicted sub-data file $C_1 \oplus B_1$; $A_2 \oplus B_1 \oplus C_1$ to the cache nodes $AP_{C1}$, $AP_{C2}$, the further complementary predicted sub-data file $C_1 \oplus B_1$; $A_2 \oplus B_1 \oplus C_1$ comprising a reversible combination of at least one re-transmitted predicted sub-data file $A_2$, $B_1$ and at least one new predicted sub-data file $C_1$.

According to some aspects, the reversible combination is an Xor, exclusive or, combination.

According to some aspects, the further complementary predicted sub-data file $C_1 \oplus B_1$; $A_2 \oplus B_1 \oplus C_1$ comprises a reversible combination of all predicted sub-data files $A_2$, $B_1$ for which the cache nodes $AP_{C1}$, $AP_{C2}$ have requested re-transmission following an initiated delivery phase, and at least one new predicted sub-data file $C_1$.

Generally, the present disclosure relates to a cache node $AP_{C1}$, $AP_{C2}$ adapted for communication with at least one served user terminal 2, 3 and a serving wireless communication node AP, where the cache node $AP_{C1}$, $AP_{C2}$ is adapted to, in a placement phase, receive, from the serving node AP, and store predicted sub-data files $A_1$, $B_1$; $A_2$, $B_2$ which comprise different parts of different data files A, B, and to receive a request for a data file RA, RB from a served user terminal 2, 3. In a delivery phase, the cache node $AP_{C1}$, $AP_{C2}$ is adapted to receive, from the serving node AP, an initial complementary predicted sub-data file $A_2 \oplus B_1$ comprising a reversible combination of the remaining predicted sub-data file $A_2$; $B_1$ for the file requested and another stored predicted sub-data file $B_1$; $A_2$, enabling the cache node $AP_{C1}$, $AP_{C2}$ to re-create the data file A, B requested by the corresponding served user terminal 2, 3. In case the cache node $AP_{C1}$, $AP_{C2}$ is unable to decode a predicted sub-data file $A_2$; $B_1$, the cache node $AP_{C1}$, $AP_{C2}$ is adapted to request re-transmission $RA_2$; $RB_1$, and to receive, from the serving node AP, a further complementary predicted sub-data file $C_1 \oplus B_1$; $A_2 \oplus B_1 \oplus C_1$ comprising a reversible combination of the re-transmitted predicted sub-data file $A_2$; $B_1$ and at least one new predicted sub-data file $C_1$.

According to some aspects, the reversible combination is an Xor, exclusive or, combination.

According to some aspects, the cache node $AP_{C1}$, $AP_{C2}$ is adapted to forward the request RA, RB for a data file A, B from the served user terminal 2, 3 to the serving node AP.

According to some aspects, the cache node $AP_{C1}$, $AP_{C2}$ is adapted to derive two accumulated copies of the signals associated with the undecoded predicted sub-data file $A_2$, $B_1$ by means of the received further complementary predicted sub-data file $C_1 \oplus B_1$; $A_2 \oplus B_1 \oplus C_1$, to decode the undecoded predicted sub-data file $A_2$, $B_1$ by means of said copies, to combine the predicted sub-data files $A_1$, $A_2$; $B_1$, $B_2$ such that a requested data file A, B is formed; and to forward the requested data file A, B to the user terminal 2, 3.

Generally, the present disclosure relates to a cache node $AP_{C1}$ in a wireless communication system 1, wherein the cache node $AP_{C1}$ is adapted for communication with at least one served user terminal 2 and a serving wireless communication node AP. The cache node $AP_{C1}$ is adapted to, in a placement phase, receive, from the serving node AP, and store, predicted sub-data files $A_1$, $B_1$ which comprise different parts of different data files A, B, and to receive a request for a data file RA from a served user terminal 2. In a delivery phase, the cache node $AP_{C1}$ is adapted to receive, from the serving node AP, a complementary predicted sub-data file $A_2 \oplus B_1$ comprising a reversible combination of the remaining predicted sub-data file $A_2$ for the file requested and another stored predicted sub-data file $B_1$, enabling the cache node to re-create the data file A requested by the corresponding served user terminal 2, and to receive, from the serving node AP, a complementary predicted sub-data file $C_1 \oplus B_1$ comprising a reversible combination of a re-transmitted predicted sub-data file $B_1$ and at least one new predicted sub-data file $C_1$.

According to some aspects, the reversible combination is an Xor, exclusive or, combination.

According to some aspects, the cache node $AP_{C1}$, $AP_{C2}$ is adapted to forward the request RA, RB for a data file A, B from the served user terminal 2, 3 to the serving node AP.

According to some aspects, the cache node $AP_{C1}$, $AP_{C2}$ is adapted to extract the remaining predicted sub-data file $A_2$ from the initial complementary predicted sub-data file $A_2 \oplus B_1$, to combine the sub-data files $A_1$, $A_2$ to generate the requested data file A, and to forward the requested data file A to the served user terminal 2.

According to some aspects, the cache node $AP_{C1}$, $AP_{C2}$ is adapted to extract the new predicted sub-data file $C_1$ from the further complementary predicted sub-data file $C_1 \oplus B_1$, and to buffer the new predicted sub-data file $C_1$ if desired.

The present disclosure is not limited to the above, but may vary freely within the scope of the appended claims. For example, the present disclosure is applicable for two or more cache nodes with associated user terminals, where the cache nodes at least can buffer two sub-files each. The third predicted data file C can be predicted when the first two data files A, B are predicted, or at a later time. The third predicted data file C can then be predicted with larger accuracy then the first two data files A, B. In the example, the first two data files A, B are transmitted to the cache nodes at a certain time since they at that time are predicted to be the most requested at a later time.

In the examples described, there is only one user terminal per cache node, but there can of course be several user terminals that are served by one cache node, where the present disclosure of course is applicable in such a case as well, as readily understood by a skilled person.

The exclusive-or combination is only an example for providing the complementary predicted sub-data files, generally any reversible combination can be used.

According to some aspects, the serving node is backhauled or connected to a core network 4 via a wired connections 5 such as a fiber connection.

According to some aspects, the present disclosure relates to efficient data transmission in coded-caching based networks, for example by using hybrid automatic repeat request (HARQ). One objective is to reduce the cost of placement phase and increase the hit-rate, without affecting the backhaul traffic in the delivery phase, often during high traffic periods. According to some aspects, depending on the message decoding status at different nodes, the placement and delivery phases may be combined, and part of data placement in cache nodes is performed during the delivery phase. Also, depending on the message decoding status/data transmission method, the cache nodes adapt their buffering methods correspondingly.

Examples of features of the present disclosure are the developing a low-complexity coded caching scheme for joint placement and delivery in high traffic periods,
adapting the signaling of cache nodes and a serving node to enable the data transmission model according to the present disclosure, and
adapting the buffering and decoding scheme of the cache nodes depending on the message decoding of other cache nodes. In this way, the backhauling cost of the server, energy efficiency as well as the interference to neighbor nodes are reduced, while the hit-rate/caching efficiency is improved.

The invention claimed is:

1. A serving wireless communication node in a wireless communication system, where the serving node comprises:
a receiver;
a transmitter; and
processing circuitry, wherein the serving wireless communication node is configured to:
predict data files to be requested at a later time by at least two served user terminals;

divide the predicted data files such that predicted sub-data files are formed;

in a placement phase, transmit a number of predicted sub-data files to corresponding cache nodes such that each cache node has a unique set of predicted different sub-data files of different predicted data files;

receive requests for data files from the served user terminals; and in a delivery phase, transmit an initial complementary predicted sub-data file to the cache nodes, the initial complementary predicted sub-data file comprising a reversible combination of the remaining predicted sub-data files for the files requested, enabling each cache node to re-create the data file requested by the corresponding served user terminal;

wherein, in case at least one cache node is unable to decode a predicted sub-data file and requests re-transmission, the serving node is adapted to receive the request for re-transmission and to transmit a further complementary predicted sub-data file to the cache nodes, the further complementary predicted sub-data file comprising a reversible combination of at least one re-transmitted predicted sub-data file and at least one new predicted sub-data file.

2. The serving wireless communication node of claim 1, wherein the reversible combination is an exclusive OR combination.

3. The serving wireless communication node of claim 1, wherein the further complementary predicted sub-data file comprises a reversible combination of all predicted sub-data files for which the cache nodes have requested re-transmission following an initiated delivery phase, and at least one new predicted sub-data file.

4. A cache node in a wireless communication system, wherein the cache node is adapted for communication with at least one served user terminal and a serving wireless communication node, where the cache node comprises:
  a receiver;
  a transmitter; and
  processing circuitry, wherein the cache node is configured to:
    in a placement phase, receive, from the serving node, and store, predicted sub-data files which comprise different parts of different data files;
    receive a request for a data file from a served user terminal;
    in a delivery phase, receive, from the serving node, an initial complementary predicted sub-data file comprising a reversible combination of the remaining predicted sub-data file for the file requested and another stored predicted sub-data file, enabling the cache node to re-create the data file requested by the corresponding served user terminal;
    wherein, in case the cache node is unable to decode a predicted sub-data file, the cache node is adapted to;
    request re-transmission; and
    receive, from the serving node, a further complementary predicted sub-data file comprising a reversible combination of the re-transmitted predicted sub-data file and at least one new predicted sub-data file.

5. The cache node of claim 4, wherein the reversible combination is an exclusive OR combination.

6. The cache node of claim 5, wherein the cache node is adapted to extract the new predicted sub-data file from the further complementary predicted sub-data file, and to buffer the new predicted sub-data file if desired.

7. The cache node of claim 4, wherein the cache node is adapted to forward the request for a data file from the served user terminal to the serving node.

8. The cache node of claim 4, wherein the cache node is adapted to:
  derive two accumulated copies of the signals associated with the undecoded predicted sub-data file by means of the received further complementary predicted sub-data file;
  decode the undecoded predicted sub-data file by means of said copies;
  combine the predicted sub-data files such that a requested data file is formed; and
  forward the requested data file to the user terminal.

9. A cache node in a wireless communication system, wherein the cache node is adapted for communication with at least one served user terminal and a serving wireless communication node, where the cache node comprises:
  a receiver;
  a transmitter; and
  processing circuitry, wherein the cache node is configured to:
    in a placement phase, receive, from the serving node, and store, predicted sub-data files which comprise different parts of different data files;
    receive a request for a data file from a served user terminal;
    in a delivery phase, receive, from the serving node, a complementary predicted sub-data file comprising a reversible combination of the remaining predicted sub-data file for the file requested and another stored predicted sub-data file, enabling the cache node to re-create the data file requested by the corresponding served user terminal; and
    receive, from the serving node, a complementary predicted sub-data file comprising a reversible combination of a re-transmitted predicted sub-data file and at least one new predicted sub-data file.

10. The cache node of claim 9, wherein the reversible combination is an Xor, exclusive or, combination.

11. The cache node of claim 9, wherein the cache node is adapted to forward the request for a data file from the served user terminal to the serving node.

12. The cache node of claim 9, wherein the cache node is adapted to extract the remaining predicted sub-data file from the initial complementary predicted sub-data file, to combine the sub-data files to generate the requested data file, and to forward the requested data file to the served user terminal.

13. A method in a serving wireless communication node in a wireless communication system, wherein the method comprises:
  predicting data files to be requested at a later time by at least two served user terminals;
  dividing the predicted data files such that predicted sub-data files are formed;
  in a placement phase, transmitting a number of predicted sub-data files to corresponding cache nodes such that each cache node has a unique set of predicted different sub-data files of different predicted data files;
  receiving requests for data files from the served user terminals; and, in a delivery phase,
  transmitting an initial complementary predicted sub-data file to the cache nodes, the initial complementary predicted sub-data file comprising a reversible combination of the remaining predicted sub-data files for the files requested, enabling each cache node to re-create the data file requested by the corresponding served user terminal;

wherein, in case at least one cache node is unable to decode a predicted sub-data file and requests re-transmission, the method comprises receiving the request for re-transmission and transmitting a further complementary predicted sub-data file to the cache nodes, the further complementary predicted sub-data file comprising a reversible combination of at least one re-transmitted predicted sub-data file and at least one new predicted sub-data file.

14. The method of claim 13, wherein the reversible combination is an exclusive OR combination.

15. The method of claim 13, wherein the further complementary predicted sub-data file comprises a reversible combination of all predicted sub-data file for which cache nodes have requested re-transmission following an initiated delivery phase, and at least one new predicted sub-data file.

16. A non-transitory computer readable storage medium storing a computer program for configuring a serving wireless communication node to perform the method of claim 13.

* * * * *